United States Patent Office 2,831,675
Patented Apr. 22, 1958

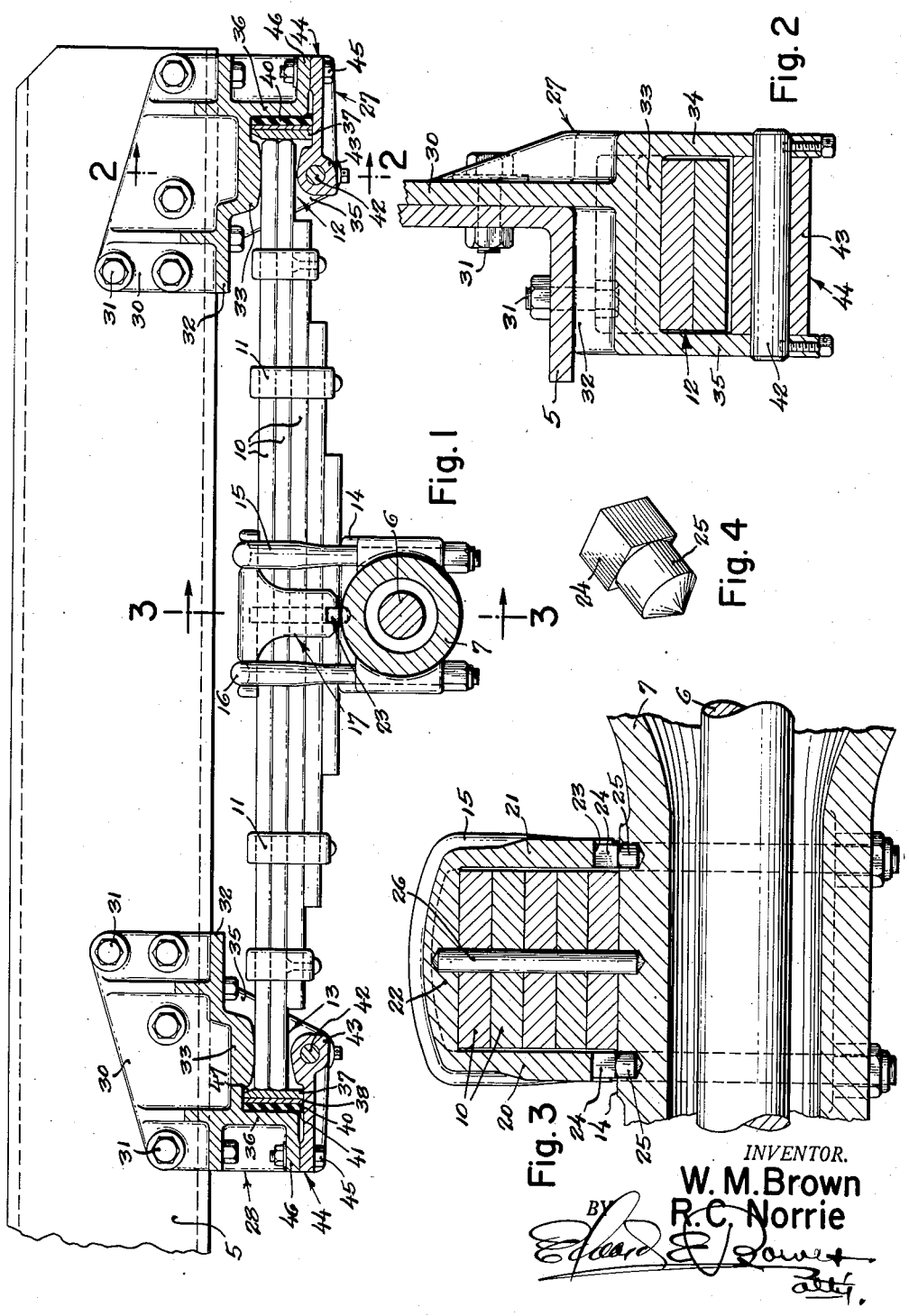

2,831,675

SPRING SUSPENSION

Robert C. Norrie and Wallace M. Brown, Seattle, Wash., assignors, by mesne assignments, to Pacific Car and Foundry Company, a corporation of Washington Application February 13, 1951, Serial No. 210,725

2 Claims. (Cl. 267—56)

This invention relates to multiple-leaf spring suspensions, and pertains especially to a rear-end suspension for heavy-duty trucks, such for example as dirt movers. Trucks of this nature subject their rear-end spring suspensions to considerable shock in consequence of the impact force of loads of dirt deposited in the trucks. Also by reason of the heavy weight of the load the suspensions encounter considerable stress from driving and braking torques. Moreover, trucks such as dirt movers are generally required to negotiate roads which are poorly if at all defined and the stresses imposed upon the spring suspensions are thus somewhat greater than would otherwise be the case.

It is a principal object of the present invention to provide a multiple-leaf spring suspension which will assure long and trouble-free service under stress of that type of work which trucks such as dirt movers are required to perform.

The invention further aims to provide an unusually rugged spring suspension so engineered as to permit the stacked spring leaves to find a slip connection with each of the two spring-end mountings, hence avoiding a common cause of breakdown in multiple-leaf springs, and namely fracture of connections which anchor a spring end to its mounting.

As a further object still, the invention aims to effectively pass into the frame of the vehicle substantially all driving and braking torque originating in the axle.

The invention has the still further and important object of providing a spring suspension in which cushioning pads are interposed between the ends of the spring stack and the spring-end mountings to absorb longitudinal shock forces, and having force-transferring devices associated with such cushioning pads for distributing the shock equally over the entire compass of the pad.

It is a yet further and particular object to devise a spring suspension of simple and inexpensive construction and one which can be serviced with a minimum of time and effort.

With these and other still more particular objects and advantages in view, and which will appear and be understood in the following description and claims, the invention consists in the novel construction and in the adaptation and combination of parts hereinafter described and claimed.

In the accompanying drawing:

Figure 1 is a view partly in side elevation and partly in longitudinal vertical section illustrating a rear-end spring suspension embodying the teachings of the present invention, the frame member of a vehicle with which said suspension is associated being shown fragmentarily.

Fig. 2 is a transverse vertical section drawn to an enlarged scale on line 2—2 of Fig. 1.

Fig. 3 is a transverse vertical section on line 3—3 of Fig. 1, employing the same scale as that used in Fig. 2; and Fig. 4 is an enlarged perspective view of the dowel which securely anchors the spring-clamping pad to the rear axle housing.

With reference being had to said drawing, the numeral 5 designates one of the two longitudinal channel members customarily employed as side principals in the frame of an automotive vehicle. 6 designates the live axle for the vehicle's engine-driven rear wheels, and 7 denotes the housing for the axle. For springing said frame from the axle housing there is employed a plurality of heavy-duty leaves 10 bound by the usual clips 11 to produce a stiff stack subject to only minor flexure under stress of loading. We have shown the stack as being composed of five leaves and of these leaves the upper two serve as main leaves and are each prolonged in a corresponding degree to present two-ply tongues, as 12 and 13, at the opposite ends of the stack. Brackets which will be hereinafter particularly described provide connection between the two tongues and the vehicle frame, and at its midlength the stack seats upon the axle housing, or more particularly upon a bolster section 14 cast integral with the housing, and is made secure to the housing by the usual U-bolts 15 and 16 exerting clamping pressure upon a pad 17 which saddles the spring stack. The pad, which is a special casting, has an inverted-U shape in end elevation to provide legs 20 and 21 depending from the cross-strap 22, and at the bottom of each of these legs there is provided a re-entrant notch 23 which is arranged to register with a related one of two upwardly opening bores provided in the bolster section of the housing. Dowels produced from square stock and turned down at one end to produce a square and a round head 24 and 25, respectively, are socketed by their round heads in the bores of the bolster section and lodge by their exposed square ends in the re-entrant notches 23. The several leaves in the spring stack are each provided at their substantial mid-length with registering drill holes, and as a complement to the dowels a pin 26 is received through these drill holes and has its upper and lower ends socketed in mating bores provided in the cross-strap 22 and in the bolster section 14, respectively. By the association of the pin and the dowels the pad is securely locked to the axle housing with each complementing the other to minimize liability of shear, and by the locking function all braking and driving torque is effectively passed from the axle housing through the spring stack into the frame of the vehicle.

The above-mentioned brackets with which the tongues connect, and which will be hereinafter termed spring-end mountings, are designated generally by 27 and 28. A detailed description of one of said mountings will suffice for the other in that the same are, functionally considered, replicas of one another, being distinguished structurally only from the fact that one may be said to be a right-hand and the other a left-hand casting. These mountings present a horizontal shelf on which the frame member 5 seats and at the outer side provide an upstanding flange 30 arranged to overlie the outer face of said frame member. Bolts 31 establish a secure connection with the frame member.

The horizontal wall 32 which provides said seat has a depressed center section 33 arranged to bear upon the related spring tongue 12 or 13, as the case may be, and at opposite sides of this center section there are provided pendant cheeks 34 and 35 closely confining the side edges of the tongue and projecting well below the lower limit of the latter. Spaced beyond the end limit of the tongue and extending as a vertical web between the two cheek walls 34 and 35 the mounting presents a thrust wall 36, and introduced between said wall and the end of the tongue are a set of filler pieces comprising a hardened steel wear plate 37 which occupies a vertical position bearing against the end of the tongue, a metal plate 38 backing the wear strip, a shock-absorbing pad 40 disposed to the rear of the backing plate, and a shim 41 applied between the pad and the thrust wall. The employed pad is produced from a material which exhibits high absorption of energy while admitting to little deflection, for example the material extensively sold under the trade name "Fabrika" and which is composed of cotton fabric embedded in rubber.

The chamber of the mounting member in which said tongue and the filler pieces are received is sectionally of an inverted-U shape, thus providing at the bottom an open throat enabling the tongue and the filler pieces to be introduced from below.

A transverse pin 42 having its ends removably fitted in the check walls 34 and 35 traverses said throat below the tongue, and journaled by its hub 43 on this pin is a keeper 44 arranged to be swung into and out of a functioning position whereat the same bears against the lower edges of the filler pieces. A bolt 45, taking its purchase from a horizontally prolonged lip extension 46 of the thrust wall 36, engages the free end of the keeper to secure the latter in its operating position. Removal of the bolt perforce allows the keeper to drop into a pendant position and gives access to the filler pieces for either re-shimming the same or replacing a worn part. The significance of providing a separate metal plate, and namely the plate 38, as a backing for the wear plate 37 is to facilitate introduction of the parts, and this is to say that the mechanic servicing the suspension assembly is enabled to first place the shim 41, the pad 40, and the backing plate 38 in position, and then force the wear plate between the tongue and the backing plate, the metal of the backing plate providing a slip surface which imposes little frictional resistance. The introduction of the wear plate is furthermore facilitated by having the inner top edge bevelled, as at 47. Should it become necessary to disconnect the spring stack from the end mountings, either to replace a spring leaf or perform repair work upon the rear-end running gear, the keepers are removed and the vehicle frame jacked up in a degree sufficient to drop the tongues through the open throats.

It is thought that the invention will have been clearly understood from the foregoing detailed description of our illustrated now preferred embodiment. Minor changes in the details of construction will suggest themselves and we accordingly intend that no limitations be implied and that the hereto annexed claims be given a scope fully commensurate with the broadest interpretation which the employed language fairly permits.

What we claim is:

1. A mounting for the terminal tongue of a spring beam comprising a housing for the tongue which is sectionally of an inverted-U shape and providing at the back end a vertical thrust wall spaced beyond the end limit of the tongue, a set of inserts closely confined in the space between said tongue and the thrust wall, and a gate serving as a keeper for the inserts and removably carried by the housing to occupy a position in the open throat of the U, said set of inserts being comprised of a hardened steel wear plate bearing against the tongue, a plate backing the wear plate and presenting a slip surface facing said wear plate, and a shock-cushioning pad lying to the rear of the backing plate.

2. A mounting for the terminal tongue of a spring beam comprising a housing for the tongue which is sectionally of an inverted-U shape and providing at the back end a vertical thrust wall spaced beyond the end limit of the tongue, a set of inserts closely confined in the space between said tongue and the thrust wall, and a gate serving as a keeper for the inserts and removably carried by the housing to occupy a position in the open throat of the U, said set of inserts being comprised of a hard metal wear plate bearing against the tongue, a plate backing the wear plate and presenting a slip surface facing said wear plate, and a shock-cushioning pad lying to the rear of the backing plate.

References Cited in the file of this patent

UNITED STATES PATENTS

| Number | Name | Date |
|---|---|---|
| 409,245 | Selle | Aug. 20, 1889 |
| 1,097,370 | Smith | May 19, 1914 |
| 1,610,787 | Jansson | Dec. 14, 1926 |
| 1,798,077 | Garner | Mar. 24, 1931 |
| 1,789,725 | Chilton | Jan. 20, 1931 |
| 2,191,941 | Reid | Feb. 27, 1940 |
| 2,559,103 | Anderson | July 3, 1951 |
| 2,650,089 | Martin | Aug. 25, 1953 |